United States Patent
Mori

[11] Patent Number: 5,745,535
[45] Date of Patent: Apr. 28, 1998

[54] PRECISION SYMBOL DISCRIMINATION TIMING DETECTION (CLOCK RECOVERY) SYSTEM FOR MULTI-CARRIER MODULATION SIGNAL

[75] Inventor: Takashi Mori, Atsugi, Japan

[73] Assignee: Anritsu Corporation, Tokyo, Japan

[21] Appl. No.: 553,063

[22] Filed: Nov. 3, 1995

[30] Foreign Application Priority Data

Nov. 8, 1994 [JP] Japan ................................. 6-273837

[51] Int. Cl.$^6$ .................................................. H04L 7/00
[52] U.S. Cl. ............................................................ 375/355
[58] Field of Search ................................... 375/326, 327, 375/339, 355, 371, 375; 329/323, 325, 360, 361

[56] References Cited

U.S. PATENT DOCUMENTS 5,228,062   7/1993   Bingham ................................ 375/344

FOREIGN PATENT DOCUMENTS 6-30070    2/1994   Japan .
6-112987   4/1994   Japan .

OTHER PUBLICATIONS

Digital MCA System RCR Standard STD-32, pp. 1–30; Research & Development Center for Radio System (in Japan), published on Mar. 17, 1993.

*Primary Examiner*—Stephen Chin
*Assistant Examiner*—Kevin Kim
*Attorney, Agent, or Firm*—Frishauf, Holtz, Goodman, Langer & Chick

[57] ABSTRACT

A provisional symbol discrimination timing detection unit detects a provisional symbol discrimination timing of a received signal modulated by a multi-subcarrier modulation scheme. A provisional symbol extraction unit demodulates the received signal and outputs, as a provisional demodulated symbol, a demodulated signal value of the provisional symbol discrimination timing of the demodulated signal for each subcarrier, demodulated signal being obtained by quadrature-demodulating the received signal. A phase difference detection unit detects a phase difference between the phase of the output provisional demodulated symbol of the received signal at a predetermined position and the phase of a reference symbol at this position. A symbol discrimination timing correction unit obtains a time difference between the provisional discrimination timing and the reference symbol discrimination timing on the basis of a subcarrier frequency and the detected phase difference for each subcarrier and corrects the provisional symbol discrimination timing on the basis of the time difference.

23 Claims, 6 Drawing Sheets

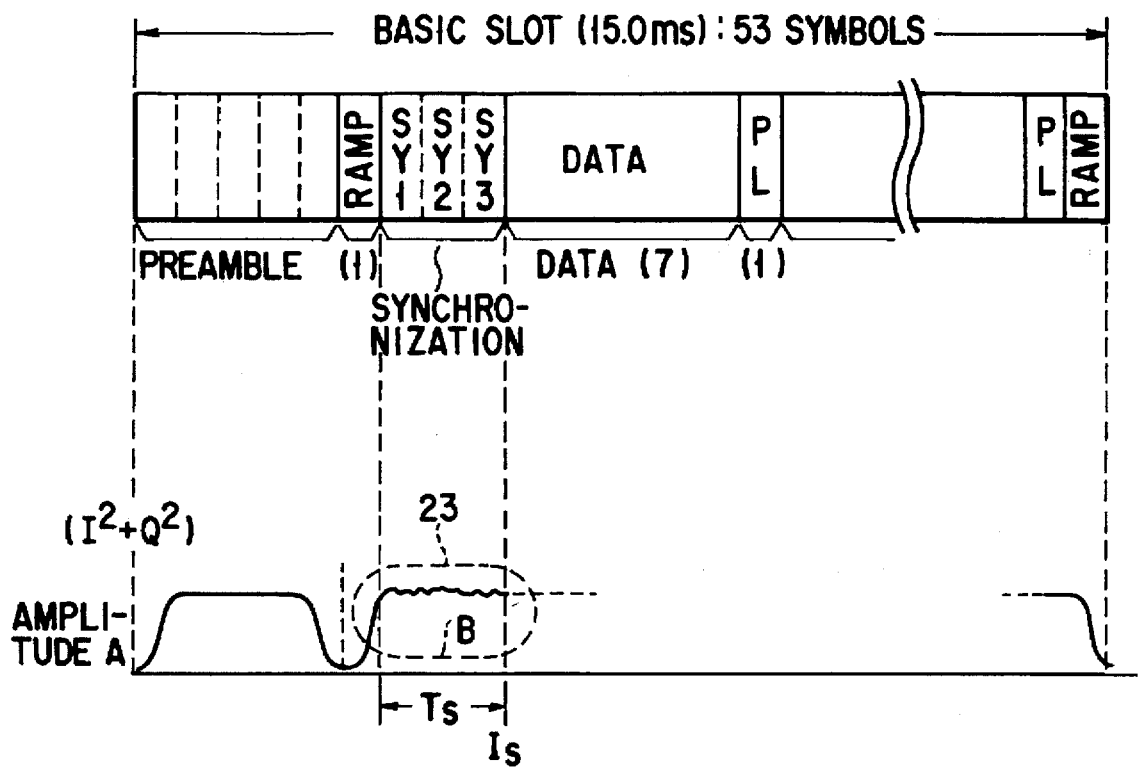
F I G. 2A
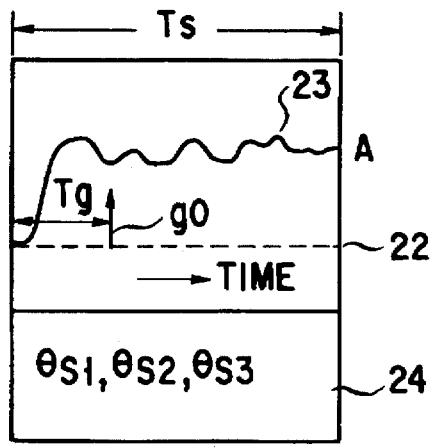
F I G. 2B

PRECISION SYMBOL DISCRIMINATION TIMING DETECTION (CLOCK RECOVERY) SYSTEM FOR MULTI-CARRIER MODULATION SIGNAL

BACKGROUND OF THE INVENTION

1. Field of the Invention

The present invention generally relates to a digital communication system such as a mobile communication and, more particularly, to a symbol discrimination timing detection (clock recovery) system for detecting (recovering) the symbol discrimination timing (clock) of a received signal in demodulating or measuring a digital modulation signal modulated by a multi-subcarrier modulation scheme.

2. Description of the Related Art

In recent years, in mobile communication systems which have rapidly spread, a PDC (Japanese personal digital cellular system), an NADC (North American Dual Mode cellular system), a GSM (European digital mobile cellular system), a DMCA (Japanese digital MCA system), and the like are known as digital communication systems using TDM (Time-Division Multiplex) and TDMA (Time-Division Multi-Access).

In such a digital communication system, radio waves having different transmission (carrier) frequencies are assigned to a base station serving as a stationary station and a mobile station serving as a movable station. The transmission time is divided into a plurality of time slots, and data communication is performed using a corresponding time slot.

In the digital communication system using the predetermined radio waves as described above, a multi-subcarrier modulation scheme using a plurality of subcarriers may be employed to improve the data transmission characteristics. More specifically, in the multi-subcarrier modulation scheme, a plurality of normal digital modulation signals are formed and are quadrature-modulated to synthesize the respective subcarrier-modulated signals. The synthesized subcarrier-modulated signals are quadrature-modulated with a main carrier, thereby transmitting them.

An M16QAM scheme employing a 16-value quadrature amplitude modulation scheme to each subcarrier on the transmission station side is available as a kind of multi-subcarrier modulation scheme. FIG. 5 is a block diagram showing an M16QAM scheme modulation apparatus using four subcarriers.

This is a scheme defined in standards RCR STD-32 (Research & Development Center for Radio Systems) for digital MCA (Multi-Channel Access) systems in Japan.

Referring to FIG. 5, serial digital data defined by predetermined clocks and sequentially input from an input terminal 1 are separated by serial/parallel conversion unit (S/P) 2 in units of four data, and each 4-bit parallel data is input to each orthogonal coding unit 3. Coded signals $S_1$ to $S_4$ output from the respective orthogonal coding units 3 are changed into baseband signals by transmission filters (baseband filters) 4, respectively. The baseband signals are then modulated with subcarrier frequencies $\omega_1$, $\omega_2$, $\omega_3$, and $\omega_4$ by subcarrier modulators 5, respectively.

The modulated signals output from the subcarrier modulators 5 are synthesized by a signal synthesizer 6. The output from the signal synthesizer 6 is time-limited into a burst signal by a window function modulator 7. The burst signal is quadrature-modulated with a carrier frequency $\omega_c$ by a quadrature modulator 8 to obtain a final M16QAM modulated signal. Through a transmitter (not shown), this signal is radiated in air as a burst signal for each slot consisting of a predetermined symbol string containing the above digital data, as shown in FIG. 7.

A digital signal demodulation apparatus on the receiving station side for demodulating the digital quadrature-modulated signal has an arrangement, e.g., as shown in FIG. 6.

A received signal a quadrature-modulated by the multi-subcarrier modulation scheme and input from an input terminal 11 is input to a synchronous detection circuit 12. The synchronous detection circuit 12 quadrature-demodulates the received signal a with the carrier frequency $\omega_c$ to output a subcarrier-synthesized signal consisting of an in-phase component I(t) and a quadrature component Q(t).

The subcarrier-synthesized signal is input to a subcarrier separation circuit 13. The subcarrier-synthesized signal input to the subcarrier separation circuit 13 is quadrature-demodulated with a frequency of the frequencies $\omega_1$, $\omega_2$, $\omega_3$, and $\omega_4$ which corresponds to each subcarrier. Subcarrier signals except for the one assigned to each subcarrier are removed from a subcarrier-synthesized signal.

Each demodulated signal b corresponding to each subcarrier and output from the subcarrier separation circuit 13 is input to a baseband filter 14 for the corresponding subcarrier. Each baseband filter 14 performs a root Nyquist filter operation for each demodulated signal b to output a demodulated signal c which does not interfere with the other symbols.

Each demodulated signal c is, however, a signal changing over time, so that its signal value must be sampled at an optimal timing for inhibiting interference with other symbols.

Each demodulated signal c output from each baseband filter 14 is input to a corresponding symbol extraction circuit 15. For each symbol extraction circuit 15, a symbol discrimination timing g from a discrimination timing detection circuit 16 is designated as position information of a symbol to be extracted. Each symbol extraction circuit 15 samples the signal value of the position designated by the symbol discrimination timing (recovery clock) g from each demodulated signal c input thereto and outputs the sampled signal value as a final demodulated symbol d.

The discrimination timing detection circuit 16 detects a specific timing such as a change timing of each symbol contained in a demodulated signal b output from a subcarrier separation circuit 13 and defines, as the symbol discrimination timing g, a timing delayed by, e.g., a predetermined time from the specific timing (see the modulated symbol timing in FIG. 7).

The discrimination timing detection circuit 16 incorporated in the digital signal demodulation apparatus shown in FIG. 6 still has a problem left unsolved.

That is, the signal values of the demodulated signals b output from the subcarrier separation circuits 13 may be kept unchanged or may be inverted every symbol in accordance with the data values transmitted through the received signal a, as a matter of course. Therefore, the timing at which the signal value of the demodulated signal changes does not necessarily represent a division timing of each symbol.

To obtain a highly accurate symbol discrimination timing g in the discrimination timing detection circuit 16, timings of changes in signal values of the demodulated signals b are extracted for a long time, and the extracted timings are statistically processed to specify the division timing of each symbol. The operation for statistically processing these timings depends on the reception time of the received signal a. Even if this statistical processing is executed using a computer having a high processing speed, it is impossible to determine the highly accurate symbol discrimination timing g within a short time.

SUMMARY OF THE INVENTION

It is, therefore, an object of the present invention to provide a new and improved symbol discrimination timing detection apparatus for a multi-carrier modulation signal in which a symbol discrimination timing is detected from a demodulated signal, and at the same time the previously detected symbol discrimination timing is corrected using the phase of the demodulated symbol to allow detection of a highly accurate symbol discrimination timing within a short period of time, thereby greatly improving the demodulation accuracy and increasing the demodulation processing speed in a digital signal demodulation apparatus incorporating this detection apparatus.

It is another object of the present invention to provide a clock recovery method for a multi-carrier modulation signal, wherein clock recovery is coarsely performed using a conventional method, and a clock error is estimated and corrected using a multi-carrier scheme, thereby realizing highly accurate clock recovery.

According to an aspect of the present invention, there is provided a symbol discrimination timing detection apparatus for a digital modulation signal digital-modulated by a multi-subcarrier modulation scheme using a plurality of subcarriers each having a predetermined frequency, the signal including a predetermined number of symbols each having a predetermined timing, the apparatus comprising: demodulation means for demodulating the digital modulation signal; provisional symbol discrimination timing detection means for detecting a provisional symbol discrimination timing for discriminating, as a provisional timing, a timing at which each symbol contained in the digital modulation signal; provisional symbol extraction means for demodulating a demodulated signal, demodulated by the demodulation means, for each subcarrier using the provisional symbol discrimination timing detected by the provisional symbol discrimination timing detection means, thereby extracting a provisional symbol; reference signal generation means for generating a reference signal for each subcarrier; phase difference detection means for detecting a phase difference between a phase at a predetermined timing of the provisional symbol extracted by the provisional symbol extraction means and a phase of the reference signal generated by the reference signal generation means, the phase of the reference signal corresponding to the predetermined timing; and symbol discrimination timing correction means for converting the phase difference detected by the phase difference detection means for each subcarrier into a time difference on the basis of each frequency of the subcarriers and correcting the provisional symbol discrimination timing detected by the provisional symbol discrimination timing detection means in accordance with the time difference.

According to another aspect of the present invention, there is provided a symbol discrimination timing detection apparatus comprising: provisional symbol discrimination timing detection means for detecting a provisional symbol discrimination timing of a received signal modulated by a multi-subcarrier modulation scheme; provisional symbol extraction means for demodulating the received signal for each subcarrier using the provisional symbol discrimination timing output from the provisional symbol discrimination timing detection means; reference signal generation means for generating a reference signal for each subcarrier; phase difference detection means for comparing, for each subcarrier, a phase, at a predetermined position, of the demodulated signal output from the provisional symbol extraction means with a phase of the reference signal generated by the reference signal generation means to detect a phase difference, the phase of the reference signal corresponding to the predetermined position; and symbol discrimination timing correction means for obtaining, for each subcarrier, a time difference between the provisional symbol discrimination timing and an intrinsic symbol discrimination timing in accordance with the phase difference detected by the phase difference detection means and a frequency of the subcarrier.

According to still another aspect of the present invention, there is provided a clock recovery method for a multi-subcarrier modulation signal, comprising the steps of: recovering a clock of the multi-subcarrier modulation signal coarsely; estimating a clock error by obtaining a relative phase difference between a plurality of subcarriers on the basis of a recovery result in the recovering step; and correcting the recovery result in the recovering step, using an estimation value of the clock error in the estimating step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A and 2B are views for explaining a technique for determining a symbol discrimination timing in the apparatus of the embodiment in FIG. 1;

DETAILED DESCRIPTION OF THE PREFERRED EMBODIMENTS

Figure 1:
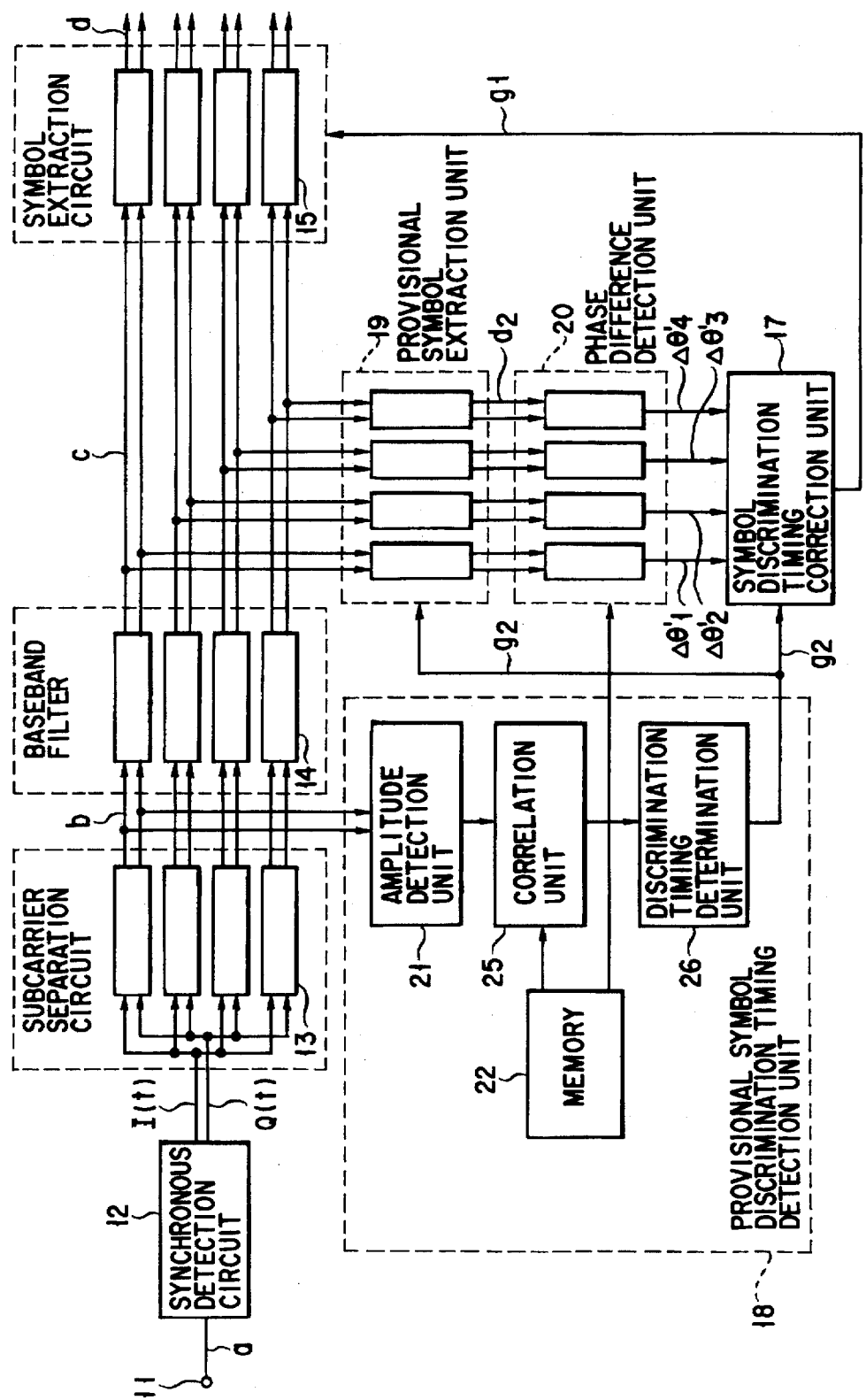
FIG. 1 is a block diagram showing the schematic arrangement of a digital signal demodulation apparatus incorporating a digital signal symbol discrimination timing detection apparatus according to an embodiment of the present invention.

Reference will now be made in detail to the presently preferred embodiments of the invention as illustrated in the accompanying drawings, in which like reference characters designate like or corresponding parts throughout the several drawings.

The present invention will be generally described below.

A digital signal symbol discrimination timing detection apparatus comprises: a provisional symbol discrimination timing detection means for detecting a provisional symbol discrimination timing of a received signal modulated by a multi-subcarrier modulation scheme; a provisional symbol demodulation means for demodulating the received signal for each subcarrier and outputting a demodulated received signal as a provisional demodulated symbol using the provisional symbol discrimination timing output from the provisional symbol discrimination timing detection means; a phase difference detection means for detecting a phase difference between a phase of a provisional demodulated symbol, at a predetermined position of the received signal, output from the provisional symbol demodulation means and a reference phase of the reference received signal at the predetermined position; and a symbol discrimination timing correction means for obtaining a time difference of the provisional symbol discrimination timing from the reference symbol discrimination timing on the basis of the phase different detected for each subcarrier by the phase difference detection means and the frequency of the subcarrier, and correcting the provisional symbol discrimination timing.

In the digital signal symbol discrimination timing detection apparatus having the above arrangement, the provisional symbol discrimination timing detection means detects the provisional symbol discrimination timing of the demodulated signal of the received signal in accordance with a variety of techniques including the above conventional technique. In addition, the provisional demodulated symbol is extracted using the provisional symbol discrimination timing from the signal obtained by demodulating the received signal for each subcarrier.

The phase of the provisional demodulated symbol at a predetermined position is detected. A phase difference between the detected phase and the reference phase of the demodulated symbol, at the reference position, of the theoretical reference received signal assumed to be ideally demodulated from the received signal is calculated.

This phase difference is caused by a time error between the provisional symbol discrimination timing and the reference symbol discrimination timing employed in extracting the correct demodulated symbol, the absolute phase of a carrier, and the offset of a carrier frequency. On the difference between subcarriers of this phase difference, the phase difference caused by the carrier are canceled, so that the phase difference caused by the symbol discrimination timing error is left.

The time error amount, i.e., the time difference can be obtained by dividing the difference between subcarriers having a phase difference by the difference in subcarrier frequency of the received signal.

The time difference is subtracted from the provisional symbol discrimination timing to obtain a correct symbol discrimination timing.

With this arrangement, the provisional symbol discrimination timing detected by the provisional symbol discrimination timing detection means is corrected to the correct symbol discrimination timing by the symbol discrimination timing correction means. Therefore, in the provisional symbol discrimination timing detection means, unlike in the conventional circuit, a highly accurate symbol discrimination timing need not be calculated in the provisional symbol discrimination timing detection means. The symbol discrimination timing can be calculated within a short period of time.

A higher detection accuracy can be expected because the symbol discrimination timing is detected in two stages.

An embodiment of the present invention will be described below.

FIG. 1 is a block diagram showing the schematic arrangement of a digital signal demodulation apparatus incorporating a digital signal symbol discrimination timing detection apparatus of this embodiment. The reference symbols denote the same parts as in the digital signal demodulation apparatus incorporating the conventional discrimination timing detection circuit 16 in FIG. 6, and a repetitive description will be omitted.

Figure 6:
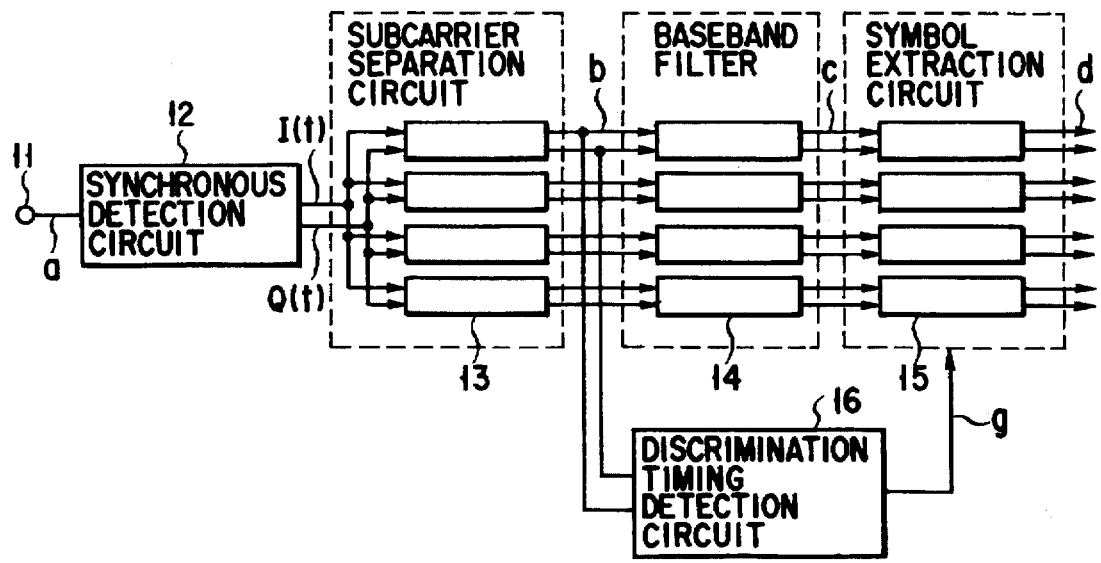
FIG. 6 is a block diagram showing the schematic arrangement of a general conventional digital signal demodulation apparatus.

A synchronous detection circuit 12, subcarrier separation circuits 13, baseband filters 14, and symbol extraction circuits 15 are identical to those in the conventional digital signal demodulation apparatus shown in FIG. 6.

A received signal a quadrature-modulated by a multi-subcarrier modulation scheme and input from an input terminal 11 is input to a synchronous detection circuit 12. This synchronous detection circuit 12 quadrature-demodulates the received signal a with the carrier frequency $\omega_c$ and outputs a subcarrier-synthesized signal consisting of an in-phase component I(t) and a quadrature component Q(t).

The subcarrier-synthesized signal is then input to each subcarrier separation circuit 13. The subcarrier-synthesized signal input to each subcarrier separation circuit 13 is quadrature-demodulated with a frequency of four frequencies $\omega_1$, $\omega_2$, $\omega_3$, and $\omega_4$ which corresponds to each subcarrier. Subcarrier signals except for the one are removed from subcarrier-synthesized signal. Each demodulated signal b corresponding to each subcarrier and output from the corresponding subcarrier separation circuit 13 is input to a corresponding baseband filter 14.

Figure 3A:
FIGS. 3A to 3C are views for explaining an operation of a baseband filter in the apparatus of the embodiment shown in FIG. 1.
Figure 3B:
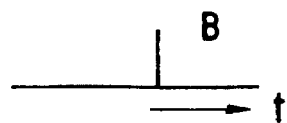
Figure 5:
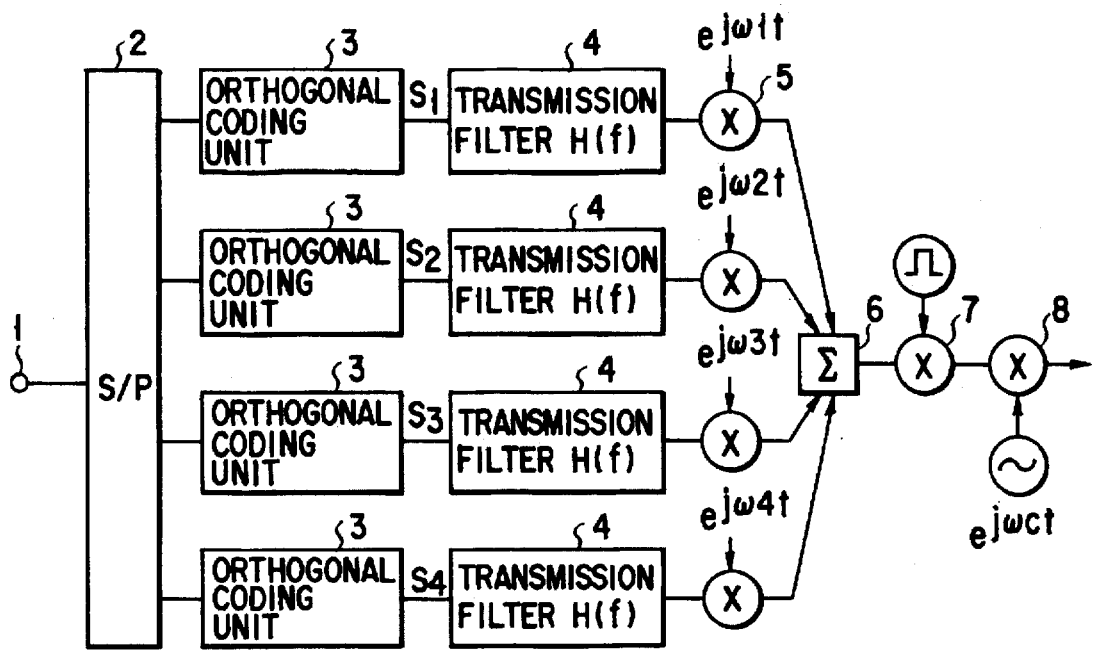
FIG. 5 is a block diagram showing the schematic arrangement of a conventional modulation apparatus employing a multi-subcarrier modulation scheme.

The cascade of characteristics of each baseband filter 4 in the modulation apparatus shown in FIG. 5 and each baseband filter 14 in the demodulation apparatus shown in FIG. 1 has a frequency characteristic shown in, e.g., FIG. 3A. At the same time, when an impulse signal B shown in FIG. 3B is input, the cascade has the time response characteristic shown in FIG. 3C.

Figure 3C:
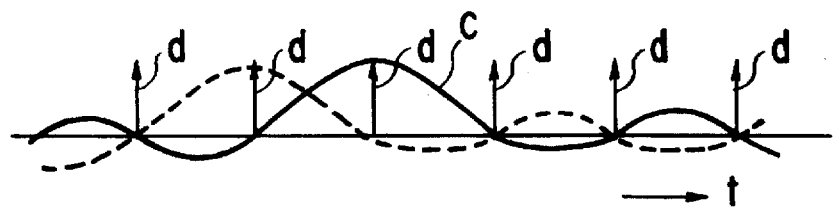

When the baseband filter 4 in the modulation apparatus has root Nyquist characteristics, the corresponding baseband filter 14 in the demodulation apparatus executes the root Nyquist filter operation for the corresponding demodulated signal b to output a demodulated signal c which does not interfere with other symbols d', as shown in FIG. 3C.

Each demodulated signal c output from each baseband filter 14 is input to a corresponding symbol extraction circuit 15. A corrected symbol discrimination timing $g_1$ from a symbol discrimination timing correction unit 17 is designated for each symbol extraction circuit 15. Of all the demodulated signals c input to the symbol extraction circuits 15, a signal value at a position designated by the symbol discrimination timing $g_1$ is sampled by the symbol extraction circuit 15. This sampled signal value is output as a final demodulated symbol d.

The symbol discrimination timing detection apparatus of this embodiment incorporated in the digital signal demodulation apparatus comprises a demodulation unit constituted by the synchronous detection circuit 12, the subcarrier separation circuits 13, and the baseband filters 14, a provisional symbol discrimination timing detection unit 18, a provisional symbol extraction unit 19, and the symbol discrimination timing correction unit 17.

The demodulated signal b containing an in-phase component I and a quadrature component Q which correspond to one subcarrier from the given subcarrier separation circuit 13 is input to an amplitude detection unit 21 in the provisional symbol discrimination timing detection unit 18.

The amplitude detection unit 21 detects the amplitude of the demodulated signal b consisting of the in-phase component I and the quadrature component Q output from the subcarrier separation circuit 13. More specifically, the amplitude detection unit 21 calculates the square value ($I^2+Q^2$) of the amplitude using the in-phase component and the quadrature component Q.

Figure 7:
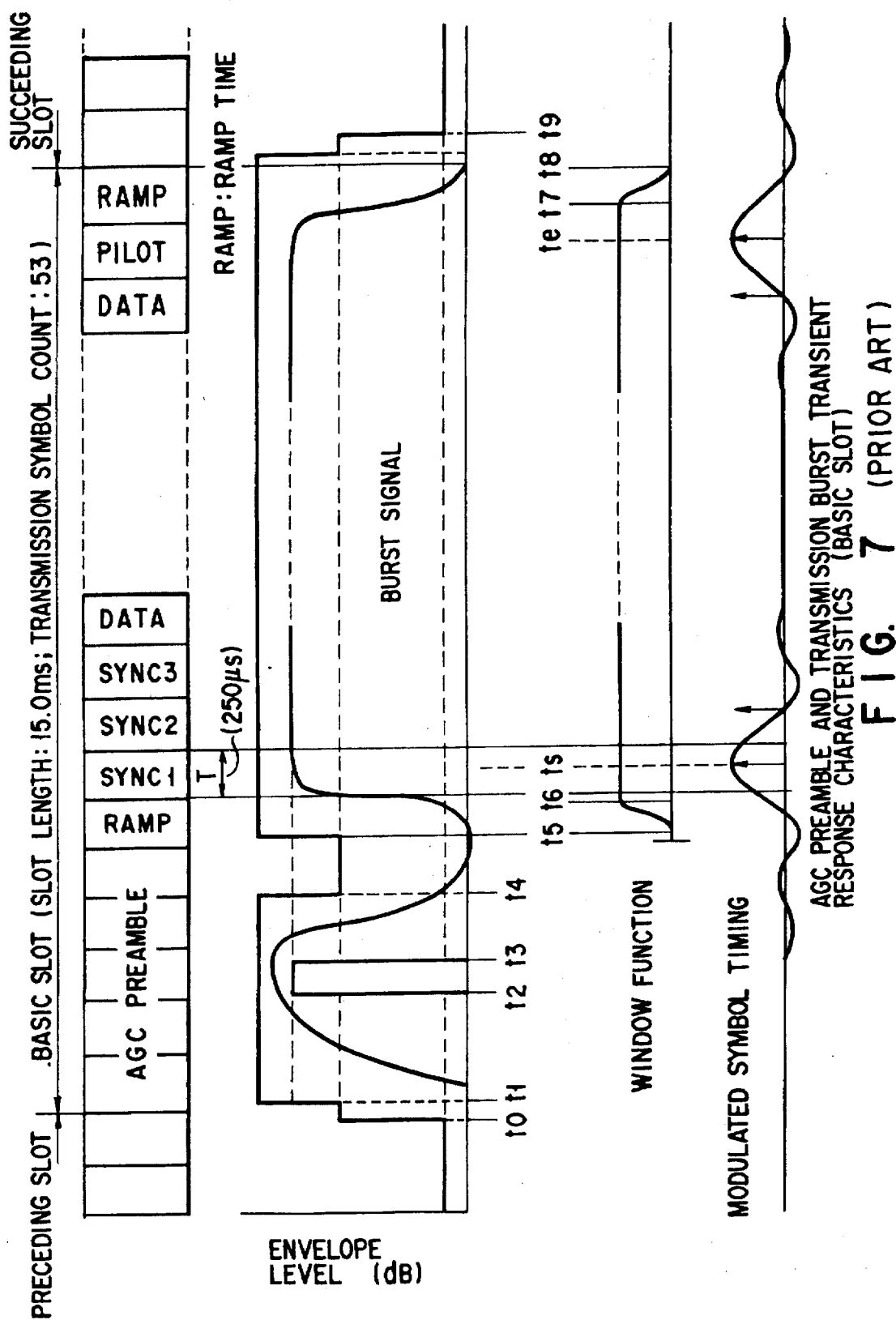
FIG. 7 is a view showing the correspondence between the modulated symbol timing of the modulated signal obtained in the modulation apparatus in FIG. 5 and the basic slots.

For example the data form of the received signal a quadrature-modulated by the multi-subcarrier modulation scheme has a transmission slot (FIG. 2A) obtained by simplifying the format (FIG. 7) as the standards (RCR STD-32, Research & Development Center for Radio Systems) of the digital MCA system in the communication system incorporating the apparatus of this embodiment.

In these standards, one transmission slot (basic uplink slot) has 60 symbols. A preamble is set in the first five symbols of length, and a one-symbol ramp portion follows the preamble. Synchronization symbols SY1 to SY3 are set for the following three symbols, respectively. Data symbols to be transmitted are set for sequentially follow these synchronization symbols SY1 to SY3. Several pilot symbols PL are inserted between data symbols. A one-symbol ramp portion is set at the end of the transmission slot.

Of these symbols, 53 symbols except to the preamble and the ramp portion are effective transmitting symbols.

The received signal a having this transmission slot is demodulated by the subcarrier separation circuits 13, and an amplitude A (square value as $I^2+Q^2$) of the resultant demodulated signal b from the subcarrier separation circuits 13 changes as indicated in FIG. 2A. This amplitude value, of course, changes depending on each symbol value.

Similarly, a phase θ obtained from the demodulated symbol d extracted from the received signal a by the symbol extraction circuit 15 also changes. This phase value, of course, changes in accordance with each symbol value.

In this transmission slot, all the values except for the data symbols to be transmitted are eigenvalues. Therefore, the amplitude value and the phase value which correspond to the eigenvalues are also nearly eigenvalues.

In this embodiment, of all the eigenvalues of the received signal a, the synchronization symbols SY1 to SY3 of the seventh symbol to the ninth symbol are used as reference symbols, and an envelope waveform of a time $T_S$ (a region B surrounded by the broken line) of the amplitude value of the demodulated signal b which corresponds to the reference symbols is stored as a reference amplitude waveform 23 in a memory 22 in advance.

The waveform positions of the reference amplitude waveform 23 and the symbol timings of the synchronization symbols SY1 to SY3 on the transmission slot have a one-to-one correspondence. Such a timing is stored as a symbol discrimination timing $g_0$ in the memory 22.

The phases θ of identical reference symbols, i.e., reference phases $θ_{S1}$, $θ_{S2}$, and $θ_{S3}$ of the synchronization symbols SY1, SY2, and SY3 are stored as reference phases 24 in the memory 22. Note that the reference phases $θ_{S1}$, $θ_{S2}$, and $θ_{S3}$ are set in units of subcarriers (e.g., $θ_{S1}=θ_{S11}$, $θ_{S12}$, $θ_{S13}$, $θ_{S14}$).

The reference phases 24 stored in the memory 22 correspond to theoretically calculated values when a theoretically correct symbol discrimination timing $g_0$ is given in the absence of the frequency offset.

The amplitude values A sequentially output from the amplitude detection unit 21 are input to a correlation unit 25 connected to the output of the amplitude detection unit 21. The correlation unit 25 also receives the reference amplitude waveform 23 of the time $T_S$ from the memory 22. The correlation unit 25 sequentially outputs correlation values between the reference amplitude waveform 23 and the measurement amplitude waveform of the latest amplitude value of the time $T_S$ from the amplitude values sequentially input from the amplitude detection unit 21. The correlation values are output to a discrimination timing determination unit 26 connected to the output of the correlation unit 25.

The discrimination timing determination unit 26 detects sampling time $t_S$ representing a maximum value of correlation values from the correlation unit 25. At this sampling time $t_S$, the received signal a is synchronized with the reference amplitude waveform 23 stored in the memory 22. The discrimination timing determination unit 26 then determines a sampling timing for the symbol discrimination timing $g_0$ before time ($T_S-T_g$) to the sampling time $t_S$ as shown in FIG. 2B and outputs this symbol discrimination timing as a provisional symbol discrimination timing $g_2$ to the symbol discrimination timing correction unit 17 and the provisional symbol extraction unit 19.

On the other hand, each demodulated signal c output from each baseband filter 14 is supplied to the corresponding intrinsic symbol extraction circuit 15 and the corresponding provisional symbol extraction unit 19.

Each provisional symbol extraction unit 19 has the same arrangement as the intrinsic symbol extraction circuit 15 and receives the provisional symbol discrimination timing $g_2$ from the provisional symbol discrimination timing detection unit 18. Each provisional symbol extraction unit 19 samples a signal value at a position of the input demodulated signal c which is designated by the provisional symbol discrimination timing $g_2$ and outputs the samples signal value as each provisional demodulated symbol $d_2$.

Each provisional demodulated symbol $d_2$ output from each provisional symbol extraction unit 19 for each subcarrier is input to a corresponding phase difference detection unit 20 for each subcarrier.

Figure 4A:
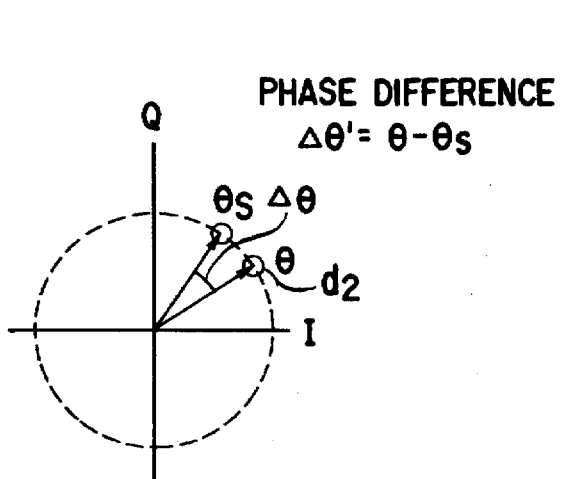
FIGS. 4A to 4C are views for explaining a process for calculating a time difference in the apparatus of the embodiment shown in FIG. 1.

Each phase difference detection unit 20 detects the phase θ of the corresponding provisional demodulated symbol $d_2$. For example, as shown in FIG. 4A, the phase θ is calculated as follows using an angle between the in-phase component I and the quadrature component Q constituting the provisional demodulated symbol $d_2$ on the complex coordinate system:

$$\text{phase } θ = \tan^{-1}(Q/I)$$

Each phase difference detection unit 20 calculates the phase of each subcarrier corresponding to the reference symbol. For example, phases $θ_{11}$, $θ_{12}$, $θ_{13}$, and $θ_{14}$ corresponding to the synchronization symbol SY1 in units of subcarriers are detected.

The respective phase difference detection units 20 calculate phase differences $Δθ_{11}'$, $Δθ_{12}'$, $Δθ_{13}'$, and $Δθ_{14}'$ between the phases $\theta_{11}$, $\theta_{12}$, $\theta_{13}$, and $\theta_{14}$ detected in units of subcarriers and the reference phases $\theta_{S11}$, $\theta_{S12}$, $\theta_{S13}$, and $\theta_{S14}$ corresponding to the same subcarriers and stored in the memory 22.

$$\Delta\theta_{11}'=\theta_{11}-\theta_{S11}, \Delta\theta_{12}'=\theta_{12}-\theta_{S12},$$

$$\Delta\theta_{13}'=\theta_{13}-\theta_{S13}, \Delta\theta_{14}'=\theta_{14}-\theta_{S14}$$

The respective phase difference detection units 20 calculate the phase differences for the remaining synchronization symbols SY2 and SY3. The resultant phase differences $\Delta\theta_{11}'$, $\Delta\theta_{12}'$, $\Delta\theta_{13}'$, and $\Delta\theta_{14}'$, and resultant phase differences $\Delta\theta_{21}'$, $\Delta\theta_{22}'$, $\Delta\theta_{23}'$, $\Delta\theta_{24}'$, $\Delta\theta_{31}'$, $\Delta\theta_{32}'$, $\Delta\theta_{33}'$, and $\Delta\theta_{34}'$ are sent to the symbol discrimination timing correction unit 17.

Figure 4B:
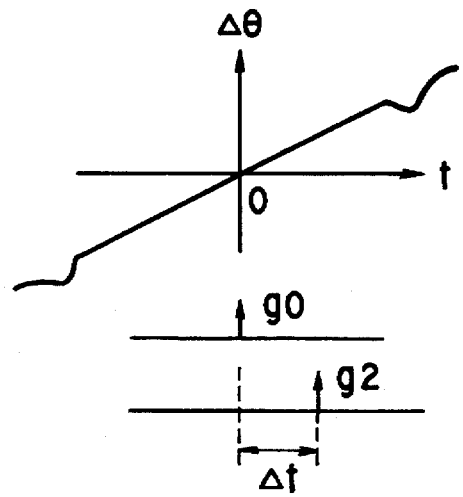

As shown in FIG. 4B, a time error between the theoretically correct reference symbol discrimination timing $g_0$ and the provisional symbol discrimination timing $g_2$, i.e., a time difference $\Delta t$, can be obtained as a value obtained by dividing the phase difference $\Delta\theta$ by the demodulation frequency, i.e., the subcarrier frequency $\omega$ in each subcarrier separation circuit 13.

$$\Delta t_1 = \Delta\theta_1/\omega_1, \Delta t_2 = \Delta\theta_2/\omega_2,$$

$$\Delta t_3 = \Delta\theta_3/\omega_3, \Delta t_4 = \Delta\theta_4/\omega_4$$

in this case, since the time differences $\Delta t_1$ to $\Delta t_4$ of the subcarriers are equal to each other, the following equation is established:

$$\Delta t_1 = \Delta t_2 = \Delta t_3 = \Delta t_4$$

Since the phases of carriers are not synchronized, it is impossible to detect the absolute phase of a subcarrier-synthesized signal. For this reason, the calculated phase difference $\Delta\theta'$ of the demodulated symbol contains a predetermined unknown phase offset $\theta_0$ as follows:

$$\Delta\theta' = \Delta\theta + \theta_0$$

When the carrier frequency has a small offset, the subcarrier-synthesized signal is rotated at the offset frequency over time. The above phase offset changes over time.

The calculated phase difference is generally represented as follows:

$$\Delta\theta_{ij}' = \Delta\theta_{ij} + \theta_{i0}$$

(i=1, 2, 3 j=1, 2, 3, 4)
where $\Delta\theta_{ij}'$: the calculated phase difference $\Delta\theta_{ij}$: the absolute phase difference $\theta_{i0}$: the phase offset in symbol i i: the symbol number j: the subcarrier number For example, subcarriers 1 and 2 are used, the following equation is derived:

$$(\Delta\theta_{11}'-\Delta\theta_{12}')/(\omega_1-\omega_2) = \{(\Delta\theta_{11}-\Delta\theta_{10})-(\Delta\theta_{12}-\Delta\theta_{10})\}/(\omega_1-\omega_2) = (\Delta\theta_{11}-\Delta\theta_{12})/(\omega_1-\omega_2)$$

The symbol discrimination timing correction unit 17 calculates the time difference between the provisional symbol discrimination timing $g_2$ and the theoretically correct symbol discrimination timing $g_0$ by the following equation:

$$\Delta t = (\Delta\theta_{14}'-\Delta\theta_{13}')/(\omega_4-\omega_3)$$

Figure 4C:
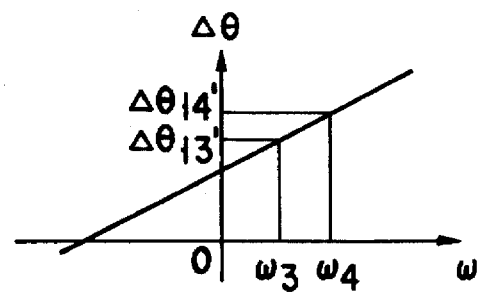

Since the above equation calculates the gradient of the phase difference with respect to the subcarrier frequency as shown in FIG. 4C, a larger number of subcarriers are used to accurately obtain the gradient, i.e., $\Delta t$ in accordance with the method of least squares.

It is possible to calculate time differences $\Delta t$ for the synchronization symbols SY1, SY2, and SY3, and the time differences are averaged to more accurately obtain the time difference $\Delta t$.

The symbol discrimination timing correction unit 17 corrects the provisional symbol discrimination timing $g_2$ output from the provisional symbol discrimination timing detection unit 18 with the calculated time difference $\Delta t$ and outputs the corrected timing as the highly accurate symbol discrimination timing $g_1$ to the intrinsic symbol extraction circuit 15.

The intrinsic symbol extraction circuit 15 samples the signal value at the position of each demodulated signal c input from the baseband filter 14, which signal value is designated by the highly accurate corrected symbol discrimination timing $g_1$, thereby outputting the final demodulated symbol d.

In the demodulated signal symbol discrimination timing detection apparatus having the above arrangement, the provisional symbol discrimination timing detection unit 18 for detecting the provisional symbol discrimination timing using the signal b demodulated by the subcarrier separation circuit 13 need not calculate a highly accurate final symbol discrimination timing, but can only calculate the provisional symbol discrimination timing $g_2$.

To obtain a highly accurate symbol discrimination timing using the demodulated signal b, a large amount of arithmetic processing including averaging processing must be performed for a long period of time. When a high accuracy is not so required, the symbol discrimination timing can be calculated by the circuit arrangement in FIG. 1 within a relatively short period of time.

A rough symbol discrimination timing is used as the provisional symbol discrimination timing $g_2$, and the provisional symbol extraction unit 19 obtains the provisional demodulated symbol $d_2$ using this provisional symbol discrimination timing $g_2$. The phase difference $\Delta\theta'$ between the provisional demodulated symbol $d_2$ and the theoretically obtained reference phase $\theta_S$ is obtained. The time difference $\Delta t$ between the provisional symbol discrimination timing $g_2$ and the reference symbol discrimination timing $g_0$ is obtained from the phase difference $\Delta\theta'$ and the subcarrier frequency, thereby correcting the provisional symbol discrimination timing $g_2$.

A time required for detecting the phase difference $\Delta\theta'$ and correcting the provisional symbol discrimination timing $g_2$ can be very short. As a result, a highly accurate symbol discrimination timing can be detected within a short period of time.

In this embodiment, the provisional symbol discrimination timing detection unit 18 detects the provisional symbol discrimination timing $g_2$ using the correlation between the reference amplitude waveform 23 and the amplitude of the demodulated signal b output from the subcarrier separation circuit 13. However, it is generally possible to non-linearly process the demodulated signal b to extract a specific component, thereby detecting a symbol discrimination timing.

It is also possible to detect the provisional symbol discrimination timing $g_2$ from, e.g., the subcarrier-synthesized signal output from the synchronous detection circuit 12.

In the phase difference detection unit 20, the phase of the provisional demodulated symbol $d_2$ is calculated, and a difference between the provisional demodulated symbol $d_2$ and the reference phase is obtained. It is, for example, possible to obtain phase difference signals $I_P$ and $Q_P$ using the in-phase component I and the quadrature component Q of the provisional demodulated symbol $d_2$, provided that a reference symbol is stored in a memory in the form of an in-phase component $I_S$ and a quadrature component $Q_S$:

$$I_P = I \cdot I_S + Q \cdot Q_S$$

$$Q_P = Q \cdot I_S - I \cdot Q_S$$

The symbol discrimination timing correction unit 17 may be directly average the phase difference signals or calculate a difference between phase differences in addition to a manner for performing a treatment similar to the above embodiment by changing the above phase difference signal to a phase difference.

In this embodiment, the synchronization symbols SY1, SY2, and SY3 are defined as the reference symbols. However, it is, for example, possible to obtain a phase difference using, e.g., data or pilot symbols. The reference symbols are not limited to the synchronization symbols.

In this embodiment, the demodulation apparatus is arranged to finally output a demodulated symbol. However, using the highly accurate symbol discrimination timing $g_1$ obtained in the present invention, the apparatus of the present invention can be incorporated in a digital signal measurement display apparatus for displaying the accurate timings of slots of modulated signals.

In each circuit of the above embodiment, the demodulation unit constituting by the subcarrier separation circuits 13 and the baseband filters 14, the provisional symbol discrimination timing detection unit 18, the provisional symbol extraction units 19, the phase difference detection units 20, and the symbol discrimination timing correction unit 17 are realized by a software means using computer programs. However, these circuits may be realized by hardware circuits.

As described above, in the digital signal symbol discrimination timing detection apparatus of the present invention, the provisional symbol discrimination timing is calculated from the signal obtained by demodulating the received signal, the provisional demodulated symbol is obtained using this provisional symbol discrimination timing, and the provisional symbol discrimination timing is corrected using the phase difference between the phase of the provisional demodulated symbol and the reference phase.

In the symbol discrimination timing detection apparatus of the present invention, the provisional demodulated symbol need not be accurately detected for a long period of time. A highly accurate symbol discrimination timing can be detected within a short period of time. The demodulation accuracy of the demodulated symbol and the demodulation processing speed in the digital signal demodulation apparatus incorporating this detection apparatus can be greatly increased.

Note that digital signal symbol discrimination timing detection according to the present invention is equivalent to digital signal clock recovery.

The theoretical ground for the present invention in view of clock recovery will be described below.

According to the present invention, coarse clock recovery is performed by a conventional technique, and a clock error is estimated and corrected using the multi-carrier scheme, thereby realizing highly accurate clock recovery.

First of all, coarse clock recovery is performed by the conventional technique. When a signal $f_m(t)$ modulated with a mth subcarrier in a Nyquist condition is sampled with a rough clock (at a timing shifted from a correct clock timing nT by $\Delta t$), the following equation is obtained:

$$f_m \times (nT + \Delta t) = \qquad (1)$$

$$\sum_{k=-\infty}^{\infty} h(nT + \Delta t - kT) \alpha_{km} e^{j(\omega_m(nT+\Delta t)+\phi)}$$

where T is the symbol period, h(t) is the impulse response of a Nyquist filter, $\alpha_{km}$ is the kth transmission symbol, $\omega_m$ is the subcarrier frequency, $\phi$ is the phase offset. The sampling result is divided by a correct symbol $\alpha_{nm} e^{j\omega_m nT}$ to obtain the following equation:

$$\frac{f_m(nT+\Delta t)}{\alpha_{nm} e^{j\omega_m nT}} = h(\Delta t) e^{j(\omega_m \Delta t + \phi)} + \qquad (2)$$

$$\sum_{k \neq n} h((n-k)T + \Delta t) \frac{\alpha_{km}}{\alpha_{nm}} e^{j(\omega_m \Delta t + \phi)}$$

The first term includes a phase rotation by $\Delta t$. The second term is obtained because the Nyquist condition is not satisfied. When random data is assumed, averaging for a plurality of symbols causes a decrease in the second term as follows:

$$\frac{1}{N} \sum_{n=1}^{N} \frac{f_m(nT+\Delta t)}{\alpha_{nm} e^{j\Omega_m nT}} \simeq h(\Delta t) e^{j(\omega_m \Delta t + \phi)} \qquad (3)$$

Since the absolute phase $\phi$ of the received signal is generally unknown, $\Delta t$ cannot be obtained from the above relation using one subcarrier. However, in multi-carrier modulation assuming the relative phases of subcarriers, it is possible to obtain phase differences between the subcarriers, thus obtaining the following relation:

$$\frac{\sum_{n=1}^{N} \frac{f_m(nT+\Delta t)}{\alpha_{nm} e^{j\omega_m nT}}}{\sum_{n=1}^{N} \frac{f_{m-1}(nT+\Delta t)}{\alpha_{nm-1} e^{j\omega_{m-1} nT}}} \simeq e^{j(\omega_m - \omega_{m-1})\Delta t} \qquad (4)$$

Since $\omega_m - \omega_{m-1}$ is known, $\Delta t$, i.e., the clock error can be immediately estimated from the above relation. Using this estimation value, the rough clock is corrected to allow accurate clock recovery.

A computer simulation was performed in which this technique was applied to a modulated signal complying with the TDMA burst signal of an M16QAM scheme (4-subcarrier 16-value QAM; symbol rate: 4 kHz; roll-off ratio: 0.2; subcarrier interval: 4.5 kHz) used in the above digital MCA.

Figure 8:
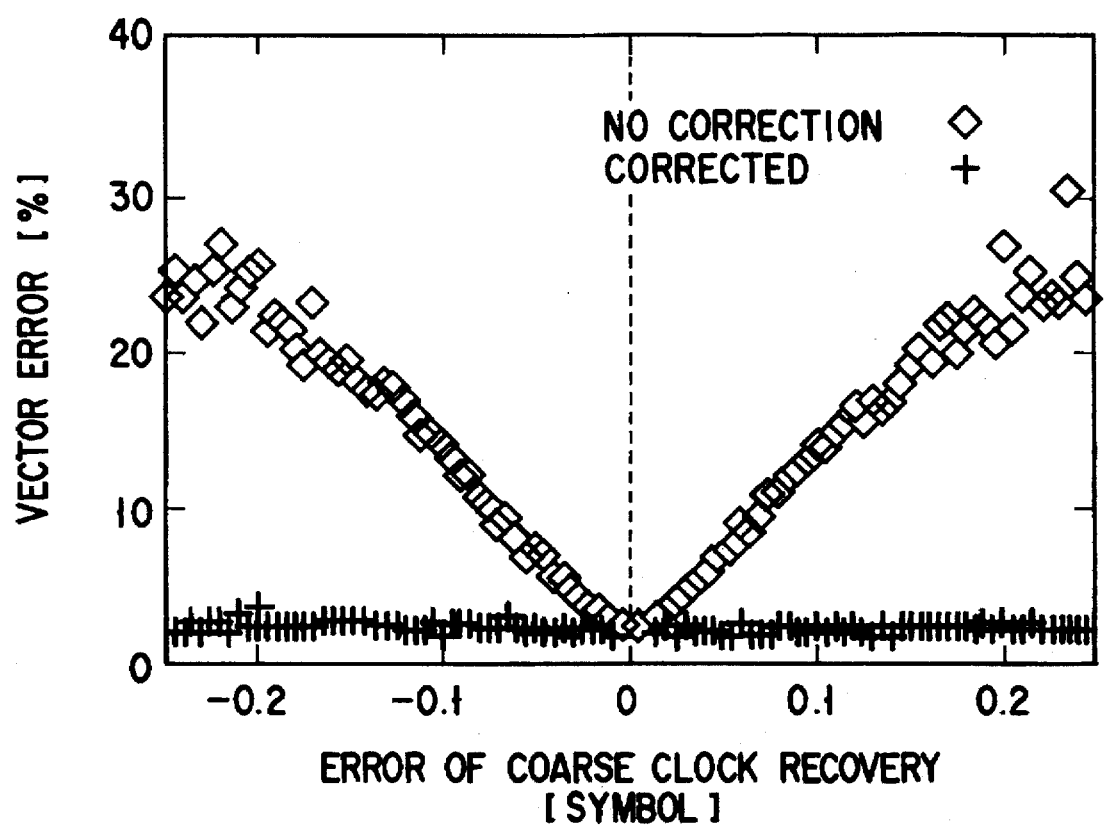
FIG. 8 is a view showing the computer simulation result of clock recovery according to the technique of the present invention.

The effect of the technique was examined by changing the error of the rough clock. Averaging in relation (3) was performed using three symbol eigenvalues (N=3), and the phase differences between the adjacent subcarriers in relation (4) were averaged to estimate the clock error. The data symbol was demodulated using a clock corrected by the error estimation value. As shown in FIG. 8, when no correction was performed, the vector error of the demodulated symbol was increased by the coarse clock estimation error. However, when correction was performed, a high accuracy having a value almost equal to an optimal value could be obtained. The first three symbols of the TDMA burst are used in error estimation, and even a short burst signal can apparently be applied to the present invention.

Additional embodiments of the present invention will be apparent to those skilled in the art from consideration of the specification and practice of the present invention disclosed therein. It is intended that the specification and examples be considered as exemplary only, with the true scope of the present invention being indicated by the following claims.

What is claimed is:

1. A symbol discrimination timing detection apparatus for a digital modulation signal digital-modulated by a multi-subcarrier modulation scheme using a plurality of subcarriers each having a predetermined frequency, said digital modulation signal including a predetermined number of symbols each having a predetermined timing, said apparatus comprising:

demodulation means for demodulating said digital modulation signal;

provisional symbol discrimination timing detection means for detecting a provisional symbol discrimination timing for discriminating, as a provisional timing, a timing at which each symbol is contained in said digital modulation signal;

provisional symbol extraction means for demodulating a demodulated signal, demodulated by said demodulation means, for each subcarrier using the provisional symbol discrimination timing detected by said provisional symbol discrimination timing detection means, thereby extracting a provisional symbol;

reference signal generation means for generating a reference signal for each subcarrier;

phase difference detection means for detecting a phase difference between a phase at a predetermined timing of the provisional symbol extracted by said provisional symbol extraction means and a phase of the reference signal generated by said reference signal generation means, the phase of the reference signal corresponding to the predetermined timing; and symbol discrimination timing correction means for converting the phase difference detected by said phase difference detection means for each subcarrier into a time difference on the basis of each frequency of the subcarriers and correcting the provisional symbol discrimination timing detected by said provisional symbol discrimination timing detection means in accordance with the time difference.

2. An apparatus according to claim 1, wherein said demodulation means comprises:

a synchronous detection circuit for quadrature-demodulating said digital modulation signal digital-modulated by the multi-subcarrier modulation scheme to output a subcarrier-synthesized signal including an in-phase component and a quadrature component; and subcarrier separation circuit means for quadrature-demodulating, for each subcarrier, the subcarrier-synthesized signal from said synchronous detection circuit to separate the subcarrier-synthesized signal into demodulated signals each containing the in-phase and quadrature components corresponding to each subcarrier, and outputting each demodulated signal.

3. An apparatus according to claim 1, wherein said apparatus further comprises:

baseband filter means for performing a predetermined filter operation for each demodulated signal from said demodulation means so as to output demodulated signals which do not interfere with each other's symbols.

4. An apparatus according to claim 2, wherein said provisional symbol discrimination timing detection means comprises:

an amplitude detection unit for detecting an amplitude of a demodulated signal containing in-phase and quadrature components corresponding to at least one subcarrier from said subcarrier separation circuit means;

a correlation unit for calculating a correlation value between an amplitude value from said amplitude detection unit and the reference signal from said reference signal generation means; and a discrimination timing determination unit for detecting a sampling time representing a maximum value of the correlation values from said correlation unit and at the same time determining the provisional symbol discrimination timing on the basis of the sampling time.

5. An apparatus according to claim 4, wherein said reference signal generation means includes a memory for prestoring a reference amplitude waveform and a reference phase which correspond to the reference symbol, so that the reference amplitude waveform and the reference phase are read out from said memory and supplied to said correlation unit and said phase difference detection means.

6. An apparatus according to claim 5, wherein the reference symbol is selected from symbols which give eigenvalues.

7. An apparatus according to claim 6, wherein the symbols which give the eigenvalues include synchronization symbols.

8. A symbol discrimination timing detection apparatus comprising:

provisional symbol discrimination timing detection means for detecting a provisional symbol discrimination timing of a received signal modulated by a multi-subcarrier modulation scheme;

provisional symbol extraction means for demodulating the received signal for each subcarrier using the provisional symbol discrimination timing output from said provisional symbol discrimination timing detection means;

reference signal generation means for generating a reference signal for each subcarrier;

phase difference detection means for comparing, for each subcarrier, a phase, at a predetermined position, of the demodulated signal output from said provisional symbol extraction means with a phase of the reference signal generated by said reference signal generation means to detect a phase difference, the phase of the reference signal corresponding to the predetermined position; and symbol discrimination timing correction means for obtaining, a time difference between the provisional symbol discrimination timing and an intrinsic symbol discrimination timing in accordance with the phase difference detected for each subcarrier by said phase difference detection means and a frequency of the subcarrier.

9. An apparatus according to claim 8, further comprising:

a synchronous detection circuit for quadrature-demodulating a digital signal quadrature-modulated by the multi-subcarrier modulation scheme to output a subcarrier-synthesized signal consisting of an in-phase component and a quadrature component;

subcarrier separation circuit means for quadrature-demodulating, for each subcarrier, the subcarrier-synthesized signal from said synchronous detection circuit to separate the subcarrier-synthesized signal into demodulated signals each containing the in-phase and quadrature components corresponding to each subcarrier, and outputting each demodulated signal; and baseband filter means for performing a predetermined filter operation for each demodulated signal from said subcarrier separation circuit means to output demodulated signals which do not interfere with each other's symbols.

10. An apparatus according to claim 9, wherein said provisional symbol discrimination timing detection means comprises:
an amplitude detection unit for detecting an amplitude of a demodulated signal containing in-phase and quadrature components corresponding to at least one subcarrier from said subcarrier separation circuit means;
a correlation unit for calculating a correlation value between an amplitude value from said amplitude detection unit and the reference signal from said reference signal generation means; and
a discrimination timing determination unit for detecting a sampling time representing a maximum value of the correlation values from said correlation unit and at the same time determining the provisional symbol discrimination timing on the basis of the sampling time.

11. An apparatus according to claim 10, wherein said reference signal generation means includes a memory for prestoring a reference amplitude waveform and a reference phase which correspond to the reference symbol, so that the reference amplitude waveform and the reference phase are read out from said memory and supplied to said correlation unit and said phase difference detection means.

12. An apparatus according to claim 11, wherein the reference symbol is selected from symbols which give eigenvalues.

13. An apparatus according to claim 12, wherein the symbols which give the eigenvalues include synchronization symbols.

14. A symbol discrimination timing detection apparatus comprising:
a subcarrier separation circuit for quadrature-demodulating, for each subcarrier, a received signal modulated by a multi-subcarrier modulation scheme;
provisional symbol discrimination timing detection means for detecting a provisional symbol discrimination timing on the basis of one subcarrier signal output from said subcarrier separation circuit;
provisional symbol extraction means for demodulating the received signal for each subcarrier using the provisional symbol discrimination timing output from said provisional symbol discrimination timing detection means;
reference signal generation means for generating a reference signal for each subcarrier;
phase difference detection means for comparing, for each subcarrier, a phase, at a predetermined position, of the demodulated signal output from said provisional symbol extraction means with a phase of the reference signal generated by said reference signal generation means to detect a phase difference, the phase of the reference signal corresponding to the predetermined position; and
symbol discrimination timing correction means for obtaining, for each subcarrier, a time difference between the provisional symbol discrimination timing and an intrinsic symbol discrimination timing in accordance with the phase difference detected by said phase difference detection means and a frequency of the subcarrier.

15. An apparatus according to claim 14, wherein said provisional symbol discrimination timing detection means comprises:
amplitude detection means for sequentially detecting amplitudes corresponding to a predetermined reference symbol in one subcarrier signal modulated by the multi-subcarrier modulation scheme;
reference amplitude storage means for prestoring a reference amplitude corresponding to the amplitude of the reference symbol;
correlation calculation means for sequentially obtaining correlation values between the amplitudes sequentially detected by said amplitude detection means and the reference amplitude from said reference amplitude storage means; and
discrimination timing determination means for determining a provisional discrimination timing on the basis of time representing the maximum value of the correlation values sequentially calculated by said correlation calculation means.

16. An apparatus according to claim 15, wherein the reference symbol is selected from symbols which give eigenvalues.

17. An apparatus according to claim 16, wherein the symbols which give the eigenvalues include synchronization symbols.

18. A digital signal symbol discrimination timing detection circuit comprising:
provisional symbol discrimination timing detection means for detecting a provisional symbol discrimination timing of a received signal modulated by a multi-subcarrier modulation scheme;
provisional symbol demodulation means for demodulating the received signal for each subcarrier and outputting a demodulated received signal as a provisional demodulated symbol using the provisional symbol discrimination timing output from said provisional discrimination timing detection means;
phase difference detection means for detecting a phase difference between a phase of a provisional demodulated symbol, at a predetermined position of the received signal, output from said provisional symbol demodulation means, and a reference phase of a reference demodulated symbol at the predetermined position; and
symbol discrimination timing correction means for obtaining a time difference between the provisional discrimination timing and the reference symbol discrimination timing on the basis of a frequency of the subcarrier and the phase difference for each subcarrier detected by said phase difference detection means, and correcting the provisional symbol discrimination timing on the basis of the time difference.

19. A circuit according to claim 18, further comprising:
a synchronous detection circuit for quadrature-demodulating a digital signal quadrature-modulated by the multi-subcarrier modulation scheme to output a subcarrier-synthesized signal consisting of an in-phase component and a quadrature component;
subcarrier separation circuit means for quadrature-demodulating, for each subcarrier, the subcarrier-synthesized signal from said synchronous detection circuit to separate the subcarrier-synthesized signal into demodulated signals each containing the in-phase and quadrature components corresponding to each subcarrier, and outputting each demodulated signal; and baseband filter means for performing a predetermined filter operation for each demodulated signal from said subcarrier separation circuit means to output demodulated signals which do not interfere with each other's symbols.

20. A circuit according to claim 19, wherein said provisional symbol discrimination timing detection means comprises:

an amplitude detection unit for detecting an amplitude of a demodulated signal containing in-phase and quadrature components corresponding to at least one subcarrier from said subcarrier separation circuit means;

a correlation unit for calculating a correlation value between an amplitude value from said amplitude detection unit and the reference amplitude; and a discrimination timing determination unit for detecting a sampling time representing a maximum value of the correlation values from said correlation unit and at the same time determining the provisional symbol discrimination timing on the basis of the sampling time.

21. A circuit according to claim 20, wherein said reference signal includes a memory for prestoring a reference amplitude waveform and reference phase of reference demodulated symbol which correspond to a predetermined symbol, as a reference symbol, contained in the digital signal, so that the reference amplitude waveform and the reference phase are read out from said memory and supplied to said correlation unit and said phase difference detection means.

22. A circuit according to claim 21, wherein the reference symbol is selected from symbols which give eigenvalues.

23. A circuit according to claim 22, wherein the symbols which give the eigenvalues include synchronization symbols.

* * * * *